Oct. 18, 1932.     F. M. CARROLL     1,882,774
COMPUTING SCALE
Filed Oct. 22, 1927     3 Sheets-Sheet 1

Inventor
Fred M. Carroll
By his Attorney

Oct. 18, 1932.  F. M. CARROLL  1,882,774
COMPUTING SCALE
Filed Oct. 22, 1927  3 Sheets-Sheet 2

Inventor
Fred M. Carroll
By his Attorney

Oct. 18, 1932.　　F. M. CARROLL　　1,882,774
COMPUTING SCALE
Filed Oct. 22, 1927　　3 Sheets-Sheet 3

Inventor
Fred M. Carroll
By his Attorney

Patented Oct. 18, 1932

1,882,774

UNITED STATES PATENT OFFICE

FRED M. CARROLL, OF YONKERS, NEW YORK, ASSIGNOR TO DAYTON SCALE COMPANY, OF DAYTON, OHIO, A CORPORATION OF NEW JERSEY

COMPUTING SCALE

Application filed October 22, 1927. Serial No. 227,904.

This invention relates to weighing scales, particularly of the computing type.

In the scale art, some of the computing scales utilize a drum chart which is proportionally moved by the scale in accordance with the weight thereon. This drum usually carries upon its periphery a number of scales, each graduated in accordance with a particular rate or price per unit weight. Each scale is adapted to disclose opposite a reading line a cost designation computed by multiplying a given weight and rate and also the corresponding weight designations. The size of drum is limited on account of the low inherent power of the scale. For this reason in order to provide a reasonable range of rates on a chart, the scales have been made with minutely spaced graduations and have therefore been difficult to read. Furthermore, certain computing scales have been provided with a chart having a double row of scales to permit a reading of the weight and price data at the back and front of the drum by both customer and clerk. This has necessitated condensing the scale sizes still more, particularly in width. Magnifying glasses have been used to a certain extent and also electric illuminating devices to magnify and make clearer the reading. However suitable these devices have been for the clerk's reading, they have one defect, which is, that the reading of the amount by the customer has been difficult unless the customer could take a position directly in front of and close to the scale. This is not always possible due to the location of the scale. To overcome this difficulty, an optical magnifying system for displaying upon a plurality of oppositely facing screens an image of a designation inscribed on the exterior of an opaque drum has been disclosed in Patent No. 1,487,514 issued to H. T. Goss and assigned to the assignee of the present invention. The screens are placed in positions convenient to the view of the customer and clerk. In said patent, use is made of a plurality of reflectors which are found to detract from the efficiency of the scale.

The object of this invention is to provide an optical magnifying system for a drum scale which functions without the use of reflectors.

Another object is the provision of a simple and more efficient optical magnifying device for drum scales.

Still another object is to display upon a plurality of screens the indications on a transparent drum scale chart.

Other objects and advantages will be apparent from the following description and appended drawings wherein:

Fig. 3 is a detail of the weight-offsetting or pendulum structure.

Figure 1:
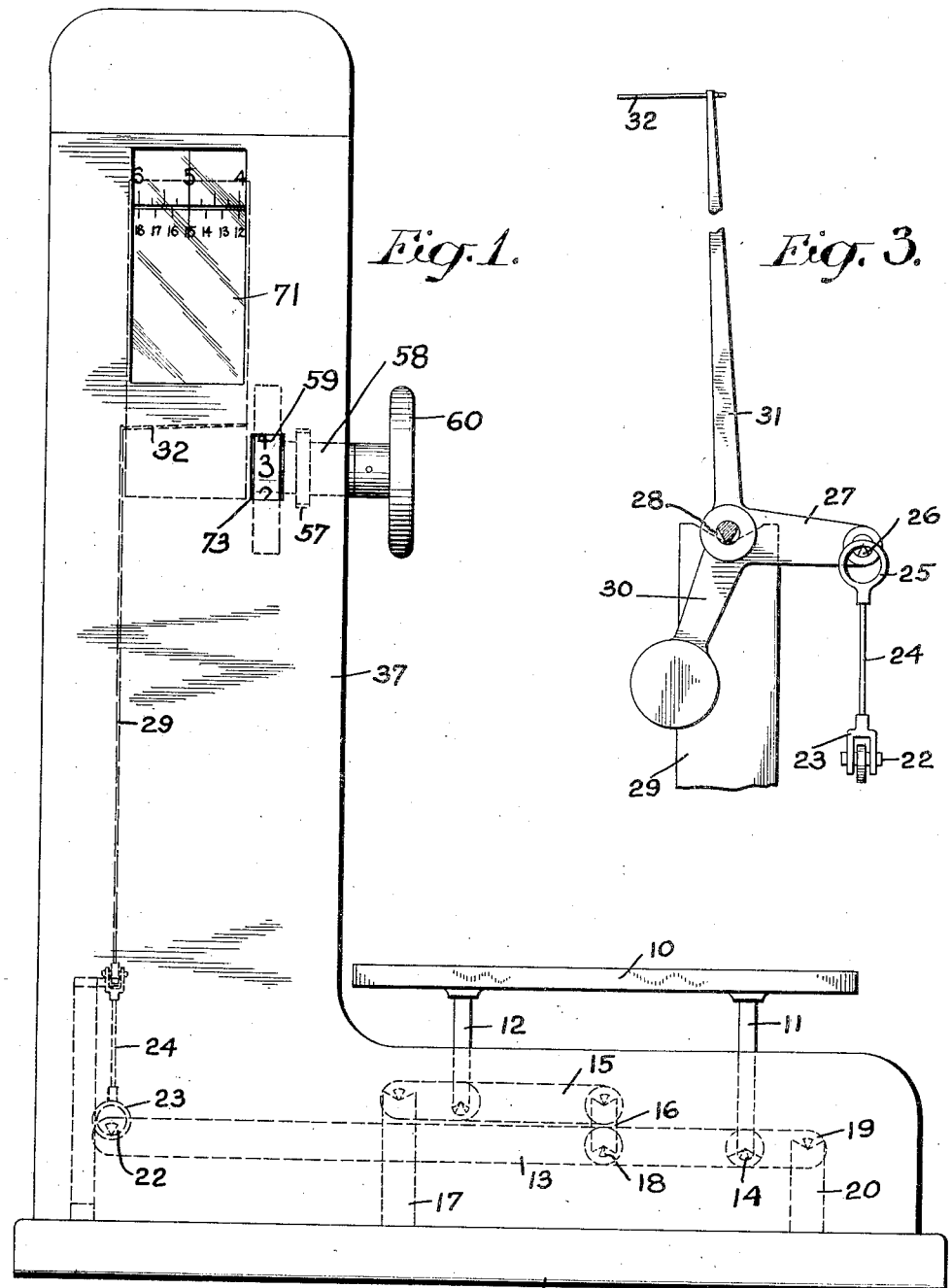
Fig. 1 is a view of the scale from the clerk's side.

In detail, the scale comprises a platform 10 upon which the article to be weighed is placed. Rods 11 and 12 are rigidly attached to the under side of the platform and transmit the load to a lever 13. Rod 11 transmits the load directly to lever 13, bearing on a knife edge 14 fixed in the latter lever, while rod 12 transmits the load to lever 13 indirectly through check links 15 and 16. The former link is supported on top of stationary post 17 and link 16, the latter resting on knife edge 18 of lever 13. Lever 13 is fulcrumed on the frame by knife edge 19 at one end bearing on a post 20 supported on the base 21. At its other end, lever 13 has a knife edge 22 in contact with the inside of a ring 23 attached to the lower end of a vertically disposed link 24. At its upper end, link 24 is provided with a second ring 25 resting on a knife edge 26 (Fig. 3) fixed in an arm 27 of a three-armed pendulum member which is pivotally supported by a knife edge 28 on a standard 29. In addition to arm 27, the pendulum has a short counterweight arm 30 and a long upwardly extending arm 31. Attached to the end of arm 31 is a flexible wire or cord 32 which passes once around the periphery of a drum 33, then is led through a guide piece 34 attached to the drum over a pulley 35, rotatably supported in bearings 36 (Fig.

Figure 2:
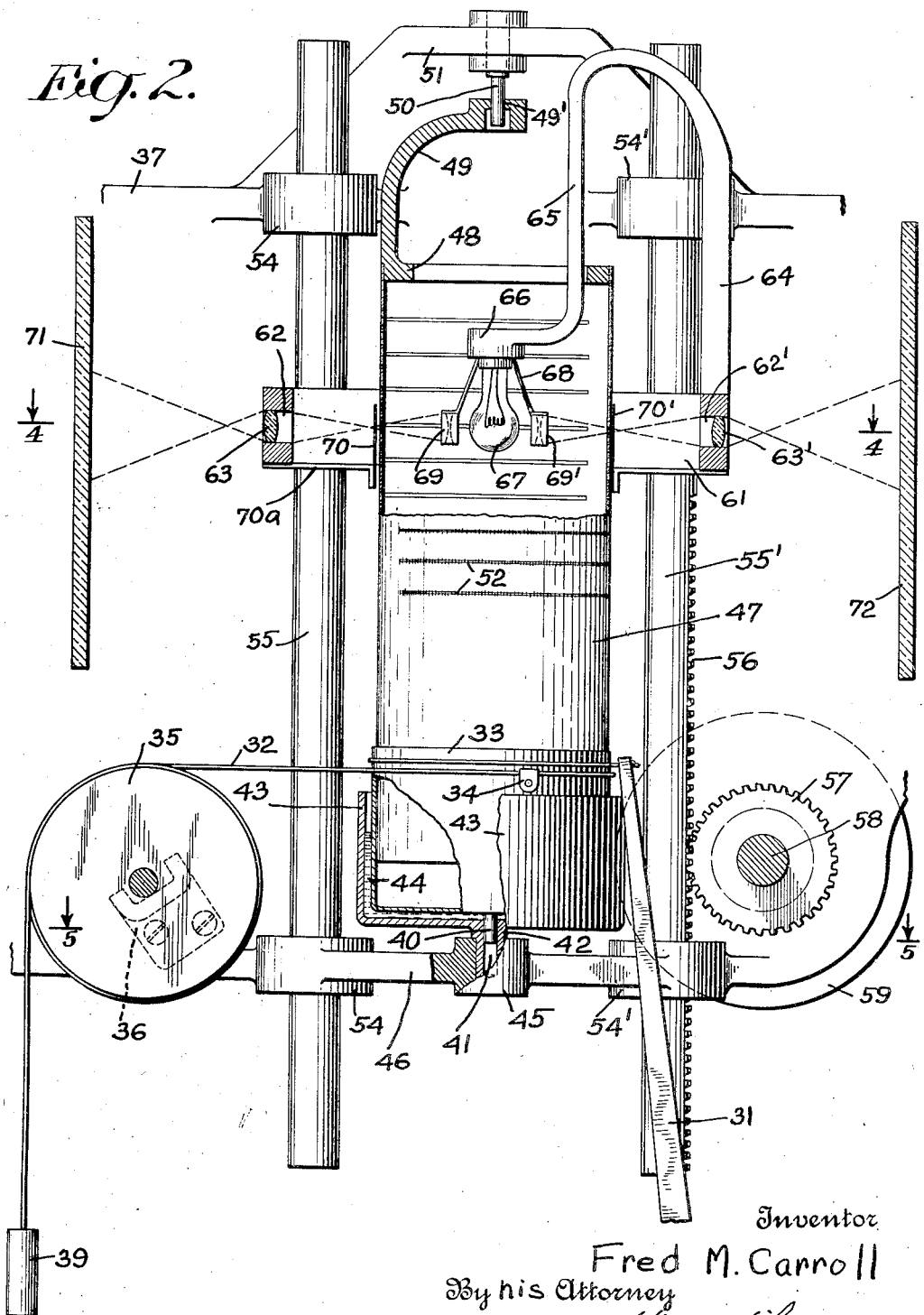
Fig. 2 is a view of the upper part of the scale with the housing removed to show the interior mechanism.
Figure 5:
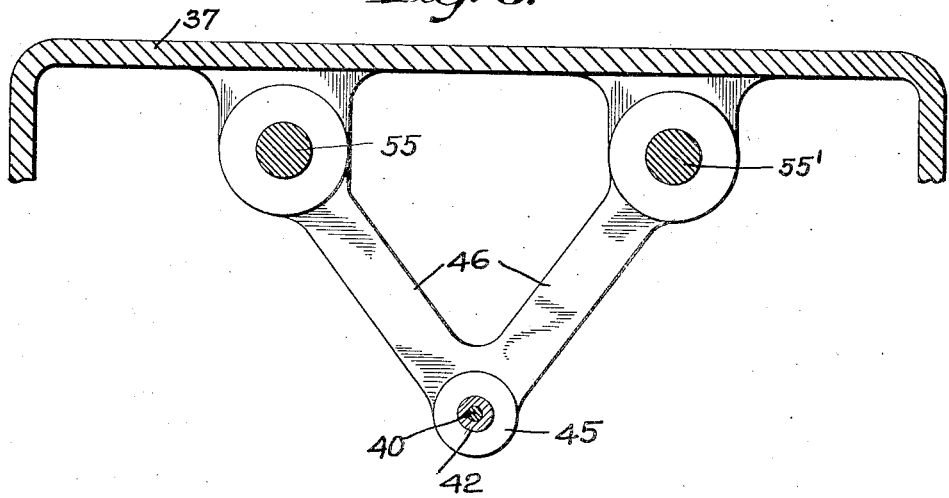
Fig. 5 is a section on line 5—5 of Fig. 2.

4) secured to the housing 37. A weight 39 is suspended from the end of the wire keeping it tautly wound on the drum in addition to acting as a counterweight. Projecting from the base of the drum is a shaft 40 (Fig. 2) rotatably supported in the opening 41 of a sleeve 42 integrally depending from the base of a stationary cup 43. The space between the cup and the drum is filled with a suitable lubricating liquid 44 in which the drum floats. The sleeve 42 of the cup is held fast in the hub 45 of a spider 46 (Fig. 5) rigid with the housing 37.

A transparent drum chart 47 is attached at its lower end to the inside of drum 33 and at its upper end is fastened to an annular band 48 formed integral with a curved bracket 49 extending upwardly from the plane of the band. The free end of the bracket is provided with an opening 49' in which is freely received stud 50 fixedly mounted in the hub of a spider 51 extending from housing 37. Shaft 40 at the lower end of drum 33 and stud 50 are vertically aligned so that the drum chart 47 rotates on a vertical axis.

The chart is provided on its periphery with a plurality of circumferentially extending parallel rows 52 having rate and weight graduations. Each row has diametrically opposite duplicate graduations.

Figure 4:
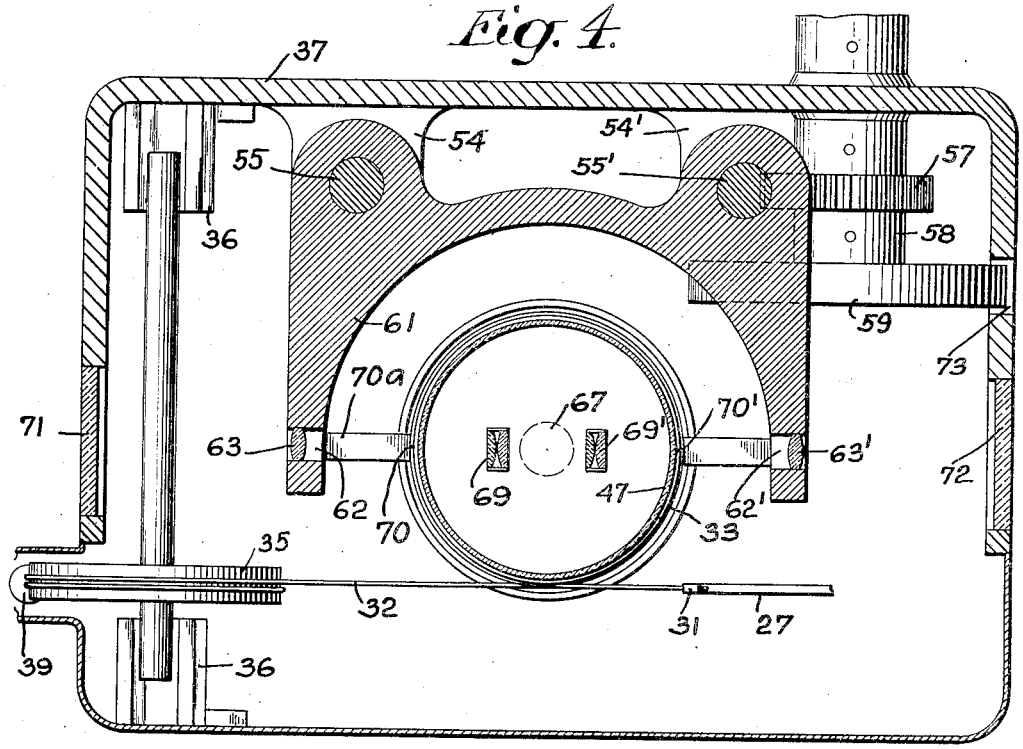
Fig. 4 is a section on line 4—4 of Fig. 2.

Frame 37 is provided with upper and lower guide collars 54 and 54' (Figs. 2 and 4) in which posts 55 and 55', respectively are slidably guided. Post 55' has rack teeth 56 cut in one side thereof which mesh with a pinion gear 57 fast on a shaft 58 journalled in the frame 37. Inside the housing, the shaft carries an indicating wheel 59, the periphery of which is marked with the numbers corresponding to the different rates on the scale chart. One end of the shaft extends outside the housing and has fixed thereto a hand-wheel 60 for rotating the shaft.

An open frame 61 extending on both sides of the cylindrical scale chart is fastened to the posts 55 and 55'. At opposite points, the frame sides are provided with openings 62 and 62' in which are mounted respectively lenses 63 and 63'. One side of the frame 61 has an extension 64 shaped to form a lamp support, the depending vertical leg 65 of which is located inside the chart and terminates in a lamp socket portion 66 in which is mounted a lamp 67. A bracket 68 is fastened to the socket portion 66 and supports a pair of condenser lenses 69 and 69' on opposite sides of the lamp. The centers of these lenses are on the same diametral line as the centers of lenses 63 and 63'. Lens 69 serves to focus a beam of light on a portion of the chart adjacent a vertical indicating hair line 70 carried by a plate 70a fixed to frame 61. The beam is further projected through reversing lens 63 upon a ground glass screen 71 mounted in the housing in view of the customer. Lens 69' focuses a beam of light on a portion of the chart adjacent indicating hair line 70' and projects the beam through lens 63' upon a ground glass screen 72 in view of the proprietor. Hair lines 70 and 70' are located close to the exterior of the drum and cross the diametral line joining the center of the lenses.

A rate row 52 of the chart when in position for reading will lie in the plane of the circle containing the diametral line joining the indicating lines 70 and 70' and the centers of the lenses. Diametrically opposite points of said rate row will have the same readings, as previously explained. Hence the beams of light focused on opposite sides of the chart by lenses 69 and 69' will project identical images upon screens 71 and 72.

The optical system carried by frame 61 may be moved up or down to read any one of the rate rows 52 by turning hand wheel 60 to rotate shaft 58. Gear 57 on said shaft thereupon rotates and coacts with rack 56 to move the posts 55 and 55' and frame 61 in the desired direction. The extent of movement of the hand wheel necessary to position the optical system for cooperation with a desired rate row is shown by the indicating wheel 59. When the optical system is in position, the periphery of said indicating wheel will display the number corresponding to the rate row through an opening 73 in the housing 37.

In operation, the desired rate row being first selected by turning hand wheel 60, the proprietor places the article to be weighed on the platform. The lever 29 is thereupon deflected and by means of the flexible cord or wire 32 rotates the floating drum 33 in its bearings an amount proportional to the weight of the article. The chart being attached to the drum rotates therewith and when it comes to rest the images of the readings on opposite sides thereof are simultaneously displayed by a beam from lamp 67 through lenses 69 and 63 upon screen 71 and through lenses 69' and 63' upon screen 72. These readings being identical as explained above, the same image will be cast on both screens, one in view of the proprietor and the other in view of the customer.

While I have shown and described and pointed out the fundamental novel features of the invention as applied to a single modification it will be understood that various omissions and substitutions and changes in the form and details of the device illustrated and in its operation may be made by those skilled in the art without departing from the spirit of the invention. I intend to be limited thereby only as indicated by the scope of the following claims:

1. In combination, in a weighing and computing scale, a weighing mechanism, a transparent drum chart having a plurality of series of identical indications, a projector positioned within said drum, and having a plurality of projection members, each adapted to coact with a different series of indications, said projector and drum being relatively movable, said latter element being connected to said weighing mechanism, and a plurality of screens upon which the projector members casts identical chart indications.

2. In combination, in a weighing scale, a weighing mechanism, a transparent drum chart and a projector positioned within said drum chart, said projector and drum chart being relatively manually movable, and said drum chart being connected to said weighing mechanism.

3. In a weighing scale, in combination, weighing mechanism, a transparent drum chart having a series of graduations, a projector positioned within said chart, and a screen upon which said projector selectively casts an image of one of said graduations, said chart and projector being relatively axially movable, and said drum chart being connected to said weighing mechanism.

4. In a computing scale, in combination, weighing mechanism, a drum chart connected thereto and having a plurality of different rate rows, each row having indications based on a different rate, and a projector movably mounted within said drum chart for selectively projecting each of said rate rows, in combination with manually operative means for moving said projector transversely to the rate rows to select one of said rows for cooperation with said projector and an indicating wheel for indicating the relative position of the chart and the projector.

5. In combination, in a computing scale, a weighing mechanism, a rotatable transparent drum chart connected thereto, said chart being provided with a series of circumferential rows of indications, a projector positioned within said drum chart, and means for selectively moving said projector to read each of said series of circumferential rows of indications.

6. In combination, in a weighing scale, a weighing mechanism, a rotatable transparent drum chart connected thereto, said chart having a plurality of identical indications, a plurality of oppositely disposed screens, and means disposed within said drum for projecting identical indications upon each of said screens.

7. In a computing scale, in combination, weighing mechanism, a drum chart connected thereto, said chart having duplicate indications spaced from each other, and a projector mounted within said drum and having a plurality of elements, each for projecting one of said duplicate indications.

8. In a computing scale, in combination, weighing mechanism, a rotatable transparent drum chart, said chart having duplicate indications spaced from each other, a projector including a lamp and a pair of magnifying lenses positioned within said drum chart, and a pair of screens upon which each of said duplicate indications is cast by said projector.

9. In combination in a scale, weighing mechanism, a transparent drum chart connected thereto, said chart having a circumferentially disposed row of indications, some of said indications being duplicates displaced from each other, a lamp positioned within said drum, a pair of magnifying lenses within said drum, and a pair of screens outside said drum, said lamp projecting a beam through one of said lenses and one of said duplicate chart indications upon one of said screens, said lamp also projecting a beam through the other of said lenses and a duplicate indication upon the other of said screens.

10. A device comprising a hollow transparent graduated chart, a projector for projecting graduations from said chart, said projector including a projecting lens mounted inside the chart and a coacting projecting lens mounted outside the chart, and means for moving said projector as a unit relative to the chart.

11. A device comprising a hollow transparent graduated chart, a projector for projecting graduations from said chart, said projector including a lamp and a projecting lens mounted on one side of said chart and a second projecting lens mounted on the other side of said chart and cooperating with said first-named lens in projecting a graduation, and means for moving said projector as a unit relative to the chart.

12. A device comprising a hollow transparent chart provided with a plurality of spaced markings, a projector mounted within the chart for projecting a marking from the chart, and means for adjusting the projector to select different markings for projection.

13. A device comprising a hollow transparent cylindrical chart having a plurality of axially spaced markings, a projector mounted within said chart, and means for moving said projector axially to select different markings for projection.

14. A device comprising a hollow transparent graduated scale chart, a projector mounted within said chart, means for adjusting said projector at will to select different graduations for projection, and a fixed screen on which the projections are cast.

15. A scale device comprising a hollow transparent graduated chart, a screen, an optical device including one element inside the chart and a coacting element outside the chart, said elements coacting with the chart to cast an image of graduations thereof on said screen, means for moving the elements and chart relatively in one direction to select graduations for display on the screen and weighing mechanism for moving said chart and elements relatively in another direction to select graduations of the chart for coaction with said elements.

16. A scale mechanism comprising a hollow transparent graduated chart, a housing therefor, a screen carried by the housing, an optical device including a pair of coacting elements, one inside the chart and one outside the chart, said elements coacting with the chart to cast an image of the graduations thereof on the screen, and means for moving the optical device to select different graduations of the chart for cooperation with said elements.

17. A scale device comprising a cylindrical chart having duplicate circumferentially alined rows of graduations the identical graduations of which are substantially 180 degrees apart, a pair of substantially diametrically opposite and circumferentially alined indicating members, each cooperating with one of the duplicate rows of graduations, and manual means for simultaneously jointly moving said indicating devices.

18. In a scale such as defined in claim 17, each indicating member including a pointer cooperating with a duplicate row of graduations.

19. In a scale, a rotatably movable transparent chart with a series of parallel rows of marks, each row arranged in an arc about the axis of movement of the chart, an optical device including means for sending a beam of light through the chart and means for intercepting the beam after it passes through the chart for projecting marks from one of the rows, load responsive means for rotating the chart relative to the optical device and causing the latter to selectively project the marks of a row in accordance with the degree of rotative movement of the chart, and means for shifting the device and chart relatively from one row to another to select the desired row for coaction with the optical device, each row being less than a complete circle, the chart having a second series of parallel rows arcuately arranged opposite to and in alinement with the other series of rows, each pair of alined rows containing identically significant marks, and said optical device including elements positioned between the alined rows for simultaneously projecting identical marks therefrom.

20. In a scale, indicating means having a plurality of parallel rows of marks, each row having a duplicate series of marks, an optical device including optical means opposite each series for projecting identical indications thereof, a unitarily movable common support for said optical means, a housing for encasing said indicating means, said optical means, and said support, an adjusting means for said support manipulable from the outside of the housing for moving the support and the optical means thereon from one row to another, and graduated means for indicating the adjustment of the support relative to the aforesaid rows said indicating means comprising a hollow chart, said optical device including elements within the hollow chart, and said common support being provided with a U-shaped bracket with one leg extending inside the chart and carrying the last mentioned element.

In testimony whereof I hereto affix my signature.

FRED M. CARROLL.